United States Patent
McCall et al.

(10) Patent No.: US 7,934,304 B2
(45) Date of Patent: May 3, 2011

(54) METHOD OF MANUFACTURING LINED TUBING

(75) Inventors: David McCall, Richmond, TX (US); Bruce Reichert, Rosharon, TX (US)

(73) Assignee: Tenaris Coiled Tubes, LLC, Houston, TX (US)

( * ) Notice: Subject to any disclaimer, the term of this patent is extended or adjusted under 35 U.S.C. 154(b) by 551 days.

(21) Appl. No.: 11/866,126

(22) Filed: Oct. 2, 2007

(65) Prior Publication Data

US 2009/0087679 A1    Apr. 2, 2009

(51) Int. Cl.
  *B21C 37/06* (2006.01)
  *B21D 39/00* (2006.01)
  *B23P 25/00* (2006.01)
  *F16L 9/00* (2006.01)

(52) U.S. Cl. ........... 29/407.05; 29/458; 29/507; 29/508; 29/525.14; 72/366.2; 72/368; 138/145; 138/151; 138/171; 219/643; 228/17.5

(58) Field of Classification Search ............... 29/407.05, 29/458, 507, 508, 516, 517, 525.14, 421.1; 138/141, 142, 151, 152, 171, 145, 153; 219/643, 219/59.1, 60.2, 78.16; 72/366.2, 367.1, 368, 72/58, 62, 370.01, 370.06; 228/17.5

See application file for complete search history.

(56) References Cited

U.S. PATENT DOCUMENTS

| 921,722 | A | * | 5/1909 | Meyer ........................ 29/896.43 |
| 1,840,305 | A | * | 1/1932 | Andrus et al. ............. 219/76.17 |
| 1,934,064 | A | * | 11/1933 | Hermanson et al. ....... 219/76.12 |
| 2,263,714 | A | * | 11/1941 | Bloomfield et al. ............ 29/523 |
| 2,886,691 | A | * | 5/1959 | Rudd .............................. 219/67 |
| 3,025,596 | A | * | 3/1962 | Ward et al. .................... 228/131 |
| 3,757,556 | A | * | 9/1973 | Kawawa et al. ................ 72/234 |
| 4,410,369 | A | | 10/1983 | Waid et al. |
| 4,449,281 | A | * | 5/1984 | Yoshida et al. .............. 29/421.1 |
| 4,590,781 | A | * | 5/1986 | Toyooka ......................... 72/181 |
| 4,688,319 | A | * | 8/1987 | Gross et al. ..................... 29/523 |
| 5,054,196 | A | * | 10/1991 | Sakaya et al. ............ 29/890.032 |
| 5,474,227 | A | * | 12/1995 | Krengel et al. ................ 228/147 |
| 6,256,938 | B1 | * | 7/2001 | Daton-Lovett ................. 52/108 |
| 6,880,220 | B2 | * | 4/2005 | Gandy ....................... 29/407.01 |
| 7,012,217 | B2 | | 3/2006 | Titze et al. |

OTHER PUBLICATIONS

Edward G. Hoffman, "Production methods", in AccessScience@McGraw-Hill, http://www.accessscience.com, Doi 10.1036/1097-8542.547200, last modified: Aug. 15, 2002.*

Office Action in corresponding Canadian patent application #2,640,235 dated Dec. 3, 2009. 3 pages.

Official Action issued in related Canadian Patent Application No. 2,640,235; Dated Jul. 2, 2010 (2 pages).

* cited by examiner

*Primary Examiner* — Jermie E Cozart (74) *Attorney, Agent, or Firm* — Osha Liang LLP (57) ABSTRACT

A method to manufacture tubing includes co-forming a base material strip and a liner material strip into a string of internally-lined tubing and joining edges of the base material strip to form a seam therebetween.

15 Claims, 10 Drawing Sheets

METHOD OF MANUFACTURING LINED TUBING

BACKGROUND OF DISCLOSURE

1. Field of the Disclosure

The disclosure generally relates to manufacturing lined tubing. In particular, the disclosure relates to a method of manufacturing copper lined coiled tubing.

2. Background Art

Casing joints, liners, and other oilfield country tubular goods ("OCTGs") are frequently used to drill, complete, and produce wells. For example, casing joints may be placed in a wellbore to stabilize and protect a formation against high wellbore pressures (e.g., wellbore pressures that exceed a formation pressure) that could otherwise damage the formation.

Steel pipe may be manufactured in various configurations, one of which is seamless, another which is seamed or welded pipe. Seamless pipes are typically more light weight and have thinner walls, while welded pipes are heavier and more rigid. Welded pipe may also have a better consistency and are typically straighter. Further, welded pipe may typically be used in instances when the pipe is not put under a high degree of stress.

Certain pipe characteristics may be controlled during production. For example, the diameter or wall thickness of the pipe may often be modified depending on how the pipe may be used. Often the type of steel will also have an impact on pipe's the strength and flexibility. Other controllable characteristics include length, coating material, and end finish.

Welded steel pipe is commonly made from heavy strip or plates of hot-rolled steel, called skelp, provided in long pieces or coiled lengths, which have their longitudinal edges finished appropriately for butt welding together when the skelp is brought into a cylindrical configuration. Such shaping of the skelp into tubular form may be achieved by suitable roll means, such as successive concave rollers through which the skelp is advanced while the rollers progressively bend it about a longitudinal axis intended for the finished tube. In the case of very large diameter pipe (e.g. about 25 inches or more in diameter), a stand of long, heavy rolls on axes parallel to the desired pipe axis, which bend an entire length of partly bent, sidewise-received skelp into the intended shape may be used.

In these or other ways, the skelp is brought, progressively or as a complete piece, into a cylindrical form, with a narrow, longitudinal cleft between the edges of the skelp. Then further rolls or other means compress the outside of the pipe blank to close the cleft, as it passes or is passed by a welding means, which welds the butted edges together. For large diameter pipe, such electrical welding may be of the submerged arc type, on the outside of the cleft, with a second, subsequent weld by another consumable electrode along the inside.

Figure 1:
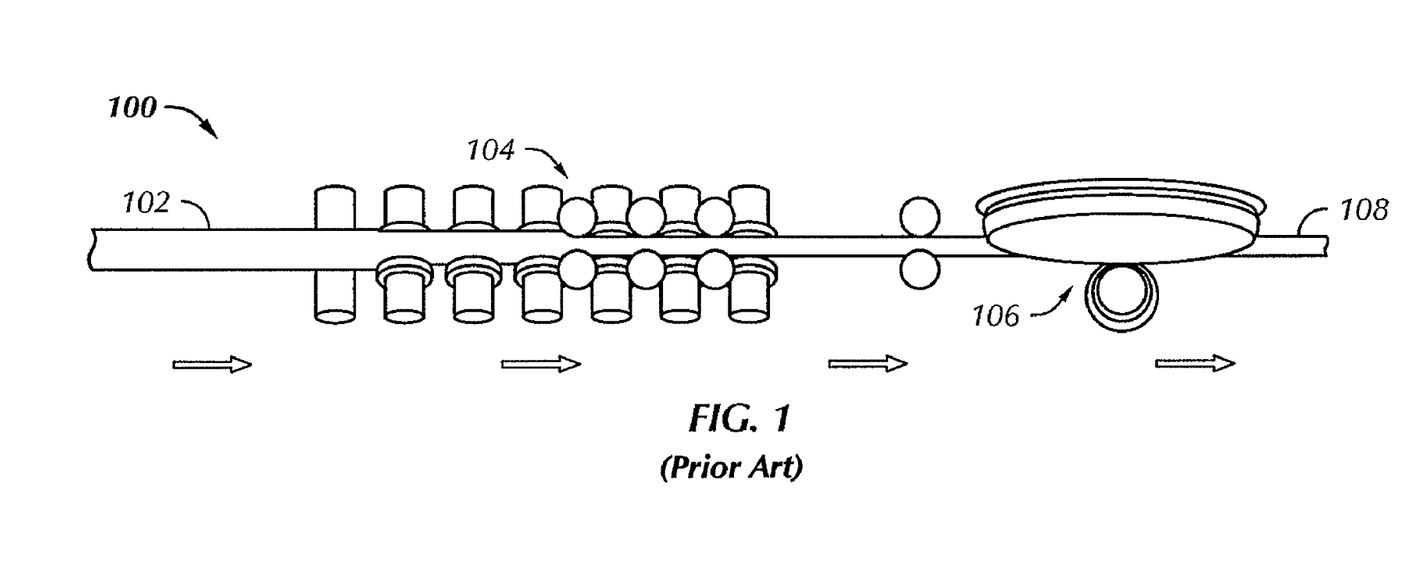
FIG. 1 is an assembly line view of a general pipe forming process.

Referring to FIG. 1, an apparatus and process to manufacture welded pipe 100 is shown. Before being manufactured, material used for welded pipe may be stored in a sheet configuration (i.e., skelp) and wound up on a roll (not shown). Initially, the skelp is unrolled and fed to rollers 102. The skelp is then passed through a series of grooved rollers, which cause the edges of the sheet to begin to "curl" together 104, finally forming an unwelded pipe. The unwelded pipe next passes by an induction welding apparatus and a high pressure roller 106, both of which seal the edges of the pipe together and form a tight weld. Finally, the pipe may be cut to a desired length and stacked for further processing 108, or remain uncut and coiled to form coiled tubing.

U.S. Pat. No. 7,012,217 ("Titze") discloses a method and apparatus for making large diameter welded pipes. A leading end of a hot strip may be connected to a trailing end of a leader strip and then subjected to a two-stage leveling for strip flatness in transverse direction and strip flatness in longitudinal direction. The entire surface of the hot strip including strip edges thereof may be inspected by ultrasound and the strip edges are prepared in four stages before being pre-bent. The hot strip may be then shaped into a slotted tube and the strip edges are welded along the inner and outer sides by laser to produce the pipe. Further, U.S. Pat. No. 4,410,369 ("Waid") discloses a method of rolling a sheet to a pipe shape, the edge zones of which are then electrically butt welded together.

Introducing a second liner layer to be rolled may present a new degree of difficulty in manufacturing welded pipe. What is needed therefore, is a method to manufacture a lined pipe in which a width of the lining material may be calculated. Such a method may help remove trial and error from the process and would be well received in industry.

SUMMARY OF INVENTION

In one aspect, embodiments disclosed herein relate to a method to manufacture tubing, the method comprising co-forming a base material strip and a liner material strip into a string of internally-lined tubing and joining edges of the base material strip to form a seam therebetween.

In another aspect, embodiments disclosed herein relate to a method to manufacture tubing, the method comprising overlaying a base material strip and a liner material strip, rolling the overlaid base and liner material strips into a string of internally-lined tubing, and welding edges of the base material strip to form a seam therebetween. The liner material substantially fills an inner diameter of the internally-lined tubing.

In another aspect, embodiments disclosed herein relate to a method to manufacture tubing, the method comprising selecting a width of a base material strip to be used in forming a string of internally-lined tubing, selecting a width of a liner material strip to be used in forming the string of internally-lined tubing, and forming the liner material strip and the base material strip into a generally tubular configuration. The method further comprises welding edges of the base material strip into the string of internally-lined tubing, the width of the liner material selected such that edges thereof do not interfere with a weld seam created between edges of the base material strip.

In another aspect, embodiments disclosed herein relate to an apparatus to manufacturing lined tubing, the apparatus comprising a tubing mill, supply equipment to provide a simultaneous supply of a base material strip and a liner material strip into the tubing mill, and alignment equipment to align the base material strip with the liner material strip as they enter the tubing mill. The tubing mill is configured to roller-form the carbon-steel strip and the copper strip into a carbon-steel tubular having an inner copper lining.

In another aspect, embodiments disclosed herein relate to a string of internally-lined tubing, comprising an outer base material comprising steel, an internal liner material comprising a copper-based alloy, a weld seam joining ends of the outer base material comprising steel, of which the internal liner material does not interfere with the weld seam.

In another aspect, embodiments disclosed herein relate to a method to manufacture tubing, the method comprising co-forming a base material strip and a liner material strip into a sting of internally-lined tubing and welding a seam in the base material strip. The base material strip comprises a width of about 2.875 inches and a thickness of about 0.190 inches.

DETAILED DESCRIPTION

Embodiments of the present disclosure generally relate to the manufacture of lined tubing. More particularly, selected embodiments of the present disclosure relate to methods and apparatus to manufacture copper lined coiled tubing.

Various applications exist which may require lined tubing, for example, downhole electric heating devices. Manufacturing lined tubing may require more complex methods of co-forming two separate strips of material into a welded pipe configuration. In particular, determining a correct size of liner material to properly fit inside an outer base material tubing may prove beneficial.

Iterations using different strip configurations may be carried out to determine an appropriate width copper strip to produce steel coiled tubing having a copper liner. Sizes and materials suggested are not intended to limit the disclosed method, but rather to illustrate a methodology used which may be extended and applied to a wide range of tubing sizes and materials available.

Figure 2A:
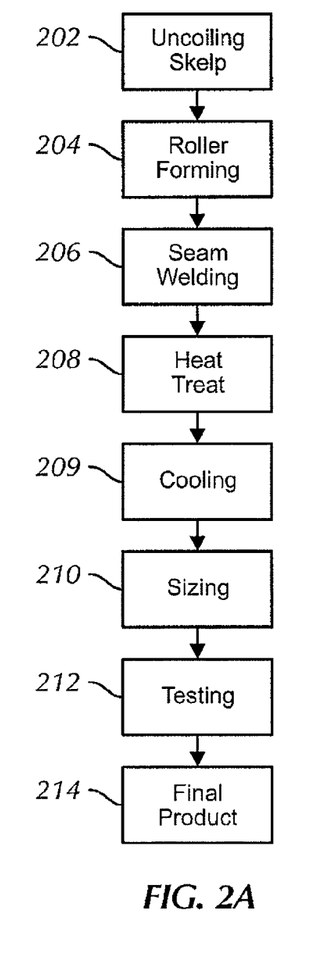
FIG. 2A is a flowchart showing a pipe forming process in accordance with embodiments of the present disclosure.

Referring now to FIG. 2A, a general pipe manufacturing process 200 of roll forming welded pipe is described. Initially, the steel comes off as rolled heavy strip or plates of hot-rolled steel, called skelp, provided in long pieces or coiled lengths and is leveled or straightened before entering the rolling phase 202. After leveling, a central part of the strip is bent by a pre-forming roller and a break down roller, whereas the sides of the strip are bent into a desired shaped by an edge-forming roller. A cage roll section, comprising multiple smaller rollers may bend the strip further without causing radical deformation in it, followed by a fin pass roll which completes the pipe forming to get a desired measurement 204.

Figure 3:
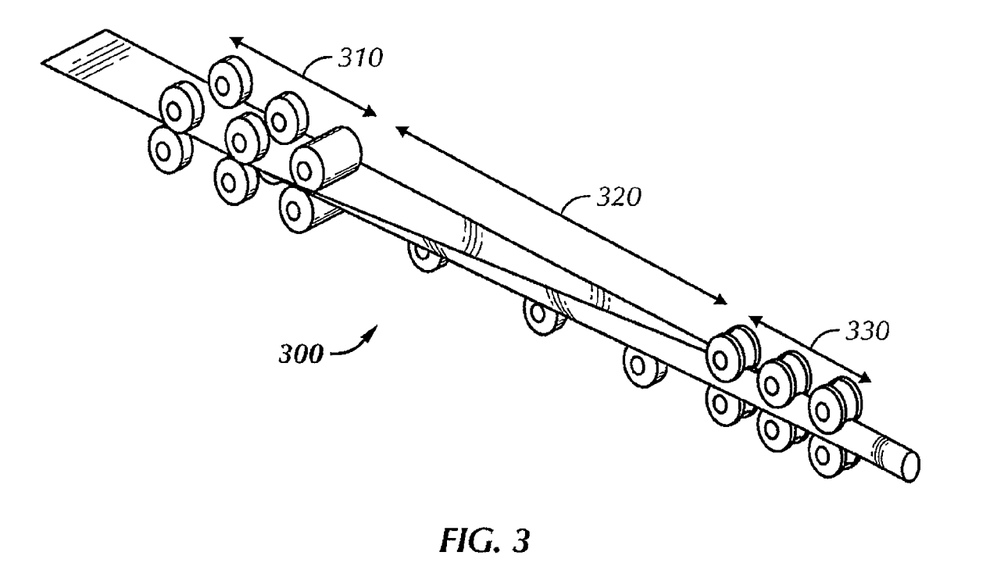
FIG. 3 is an assembly view of a roller section of a pipe forming assembly line in accordance with embodiments of the present disclosure.

Referring to FIG. 3, a rolling apparatus 300 of the pipe manufacturing process is shown for further clarity. As shown, the strip first passes through successive break down rollers 310 which initiate the process of deforming it to a desired cylindrical configuration. A middle section of cage rollers 320 comprises multiple successively smaller rollers which gradually continue the shaping of the strip into the desired cylindrical configuration. Finally, the fin pass rollers 330 complete the forming of the pipe to the desired cylindrical configuration.

Referring back to FIG. 2, the two edges of the strip shaped into a pipe create a seam which may be welded 206. High frequency resistance welding may be performed on the seam edges to join them together. Optionally, an impeder core may be used in the welding process to improve welding efficiency. If used, the impeder core passes through the center of the tube while the seam is welded. After welding, the pipe may be heat treated 208, the heat treatment including seam annealing of the weld seam to improve the quality of the weld, and heat treatment of the entire pipe. After heat treating, the pipe may be air or water-cooled 209. Heat treatment of the pipe may help to create a minimum hardness, improved toughness, and better machineability of the material. Next, any inconsistencies in the pipe may be corrected in a sizing stand at 210, which comprises rollers around the periphery of the pipe, followed by cutting the pipes to desired lengths.

Additionally, pipe quality may be examined through multiple tests including, but not limited to, a flattening test, hydrostatic test, ultrasonic test of the welded seam, and a rotary ultrasonic test of the full pipe body 212. It is noted that testing and appropriate configurations for testing may be known to one having ordinary skill in the art. Still further, the pipe ends may be faced and pipe surfaces marked with specifications for easier identification, resulting in a final pipe product 214.

Method to Manufacture Lined Tubing

Figure 2B:
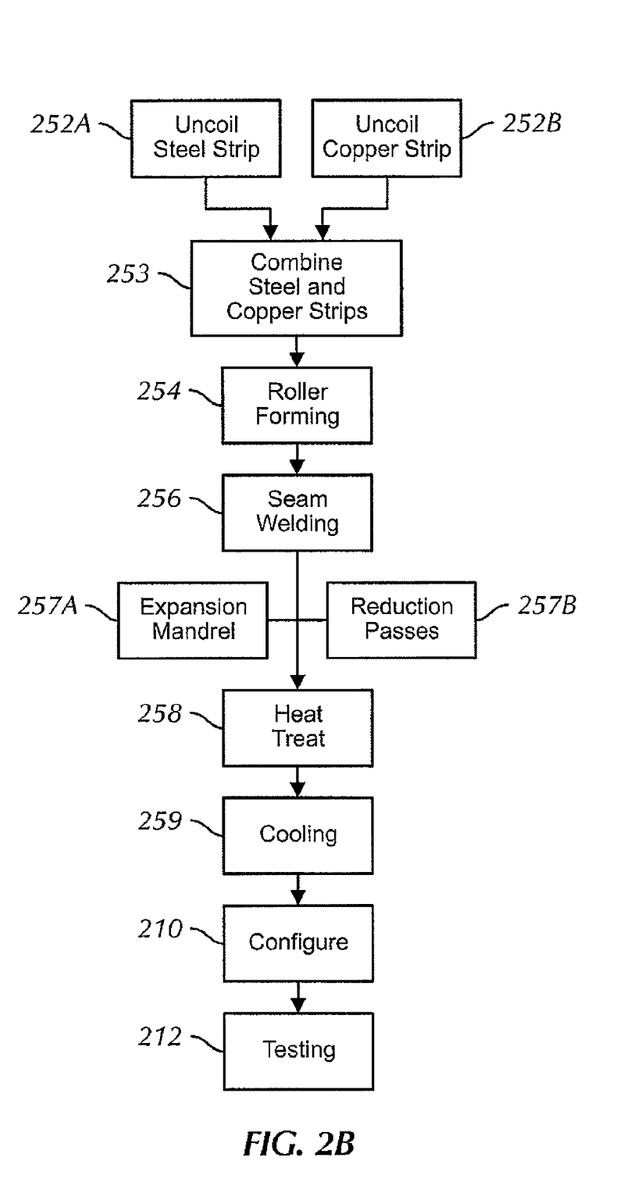
FIG. 2B is a flowchart showing a copper lined steel tubing forming process in accordance with embodiments of the present disclosure.

Referring to FIG. 2B, a method to manufacture copper lined tubing is described in accordance with selected embodiments of the present disclosure. It should be understood that an outer base material may comprise materials such as steel or any other material known to one having ordinary skill in the art. Further, it is understood that an internal liner material may comprise materials such as copper, brass or any other materials known to one having ordinary skill in the art. The liner materials may be selected based upon their ductility, or based on some other property, such as electrical conductivity or resistivity, for example.

In one embodiment, to begin manufacture of the lined tubing, material supply equipment, or a spool containing a steel strip 252A and a spool containing a copper strip 252B are configured to advance the two strips to mill rollers at the same feed rate. The unrolled copper strip may be combined with and placed on top of the unrolled steel strip and centered prior to entering mill rollers 253. The copper strip may be centered on the steel strip using strip alignment tools or other methods known to those skilled in the art. A mill roller used in manufacturing welded pipe without liner as described previously may be used to manufacture lined tubing, with appropriate adjustments being made for size differences. The copper strip may be positioned as close to center on the steel strip as possible prior to forming so that the edges of the copper strip may be positioned at the same location circumferentially as the edges of the outer steel strip when complete. Further, the mill rollers may be adjusted to account for the additional copper thickness and allow the two strips to pass through. The steel/copper combination may be fed through the rollers to form a seamed pipe having an internal liner 254.

The seam formed by the edges of the steel strip may be welded using High Frequency Induction Electric Resistance Welding (HFI-ERW), or any other welding process known to a person skilled in the art 256. It should be noted that in this embodiment only the seam of the outer steel tube is welded while the seam of the internal copper liner space is not. As such, a weld bead may be formed on both the inside and outside surfaces of the steel tubing. A scarfing tool may be used to remove the excess weld bead from surfaces of the steel tubing.

Figure 4:
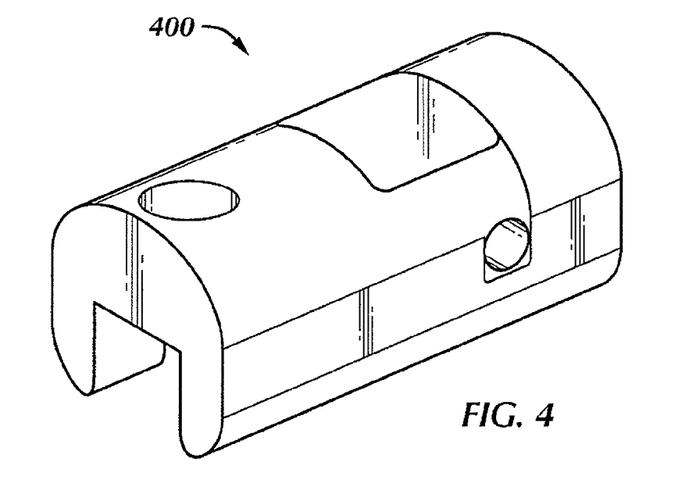
FIG. 4 is a component view of an expansion mandrel in accordance with embodiments of the present disclosure.

In selected embodiments, an expansion mandrel may be used when forming the lined tubing 257A. Referring to FIG. 4, an expansion mandrel 400 is shown in accordance with embodiments of the present disclosure. After passing through the mill rollers 254 and welding machine 256, at which point the lined tubing takes shape, the lined tubing may pass over the expansion mandrel which may be located inside the lined tubing to expand the inner copper liner radially outward and substantially against an inner surface of the steel tubing. In selected embodiments, the lined tubing may pass over the expansion mandrel before the welding operations. Further, the expansion mandrel may be constructed of material such as tool steel or materials known to those skilled in the art. Further, the expansion mandrel may have a cylindrical outer surface, a faceted or polygonal outer surface, or other shapes known to those skilled in the art.

In certain embodiments, the steel tubing may be formed slightly oversized such that a slight gap may exist between the inner surface of the steel tubing and the outer surface of the copper liner. The steel tubing may then be reduced in diameter by repeated passes through sizing rollers 257B. In one embodiment, the sizing rollers may reduce the steel tubing by about 0.005 inches per pass. The initial amount of "oversizing" of the steel tubing may be determined by one skilled in the art and may be calculated using various methods including a 'Pi" tape, calipers, or automated measurement systems.

In selected embodiments, the copper liner may additionally be expanded radially by the roller mandrel 257A. Reduction of the steel tubing and expansion of the copper liner may occur simultaneously, or the steps may occur one before the other regardless of the order in which they occur.

Further, the lined tubing may be passed through a series of heat treatments including weld seam annealing and a heat treatment of the entire lined tubing 258. The seam annealer, as previously mentioned, may help to improve the quality and reduce brittleness of the weld. It should be noted that the weld temperature and seam annealing temperatures used for manufacturing the tubing may be set as would be for a steel tube without copper. It should be understood that weld temperatures and seam annealing temperatures would be known to one having ordinary skill in the art. Still further, the lined tubing may pass through a heating operation such as a heating coil which heat treats the entire lined tubing body. After the heat treatment, the lined tubing may be air or water cooled as known to those skilled in the art.

Still further, the lined tubing may be cut into lengths of pipe, or may be coiled onto a spool and configured as coiled tubing 210 depending on intended use or customer preference. Once configured, testing of the lined tubing 212 may be conducted as appropriate before passing into operation. Various testing procedures may be understood by those skilled in the art.

Experimental Tests

In order to determine optimal combinations of base material (e.g., carbon steel) with liner material (e.g., copper) for a particular size of lined pipe, several proof-of-concept tests were performed under manufacturing conditions. In one such test, a carbon steel tube is to have an approximate 2⅞ inch outer diameter (OD) tube and a 0.190 inch wall (base material) thickness. Various samples of copper strip having a 0.125 inch thickness between about 7 inches and about 8 inches in width were used to line the carbon steel tube to encompass a range of test sizes.

In one test, a 7.76 inch wide strip of copper material was selected based on the inner circumference of the 2⅞ inch× 0.190 inch steel tube less a weld root thickness and an arbitrary 0.06 inch clearance. Next, 7.34 inch and 7.38 inch wide strips of copper were tested based on a mid-wall circumference of the 0.125 inch thick copper strip formed against the steel tube inner diameter (ID) less the weld root thickness and a 0.06 inch clearance. Further, 8.08 inch, 7.08 inch, and 7.14 width copper strips were used to create extra data points around the 7.76 inch, 7.34 inch, and 7.38 inch copper strip width samples.

Each of the previously mentioned widths of copper strip may be used in manufacturing the copper lined steel tubing. From each 10 foot test section of copper liner material and steel base material, an 18 inch sample of internally-lined tubing was created for tensile testing, a 6 inch sample was created for crush and flair testing, a 36 inch sample was created for hydrostatic testing, and four 6 inch samples were created for visual examination.

From tests conducted on samples, the following attributes were evaluated following manufacture of the copper lined carbon-steel tubing. The fit of the copper liner in the carbon-steel tubing was evaluated visually, checking that no gaps existed between the copper liner and the carbon-steel tube. Further, the copper liner was checked to ensure that it did not interfere with an internal portion of the weld bead in the carbon-steel tube. The effect of the copper liner on annealing the seam weld was evaluated by visual inspection of a seam weld macro. Further, tensile properties of the tubing were evaluated using a tensile test, from which yield strength, tensile strength, and elongation were measured. Further, the interference fit of the copper liner in the carbon-steel tube was evaluated by axially pushing the copper liner out of one of the specimens. Further still, weld quality of the longitudinal seam weld was evaluated.

Figure 5:
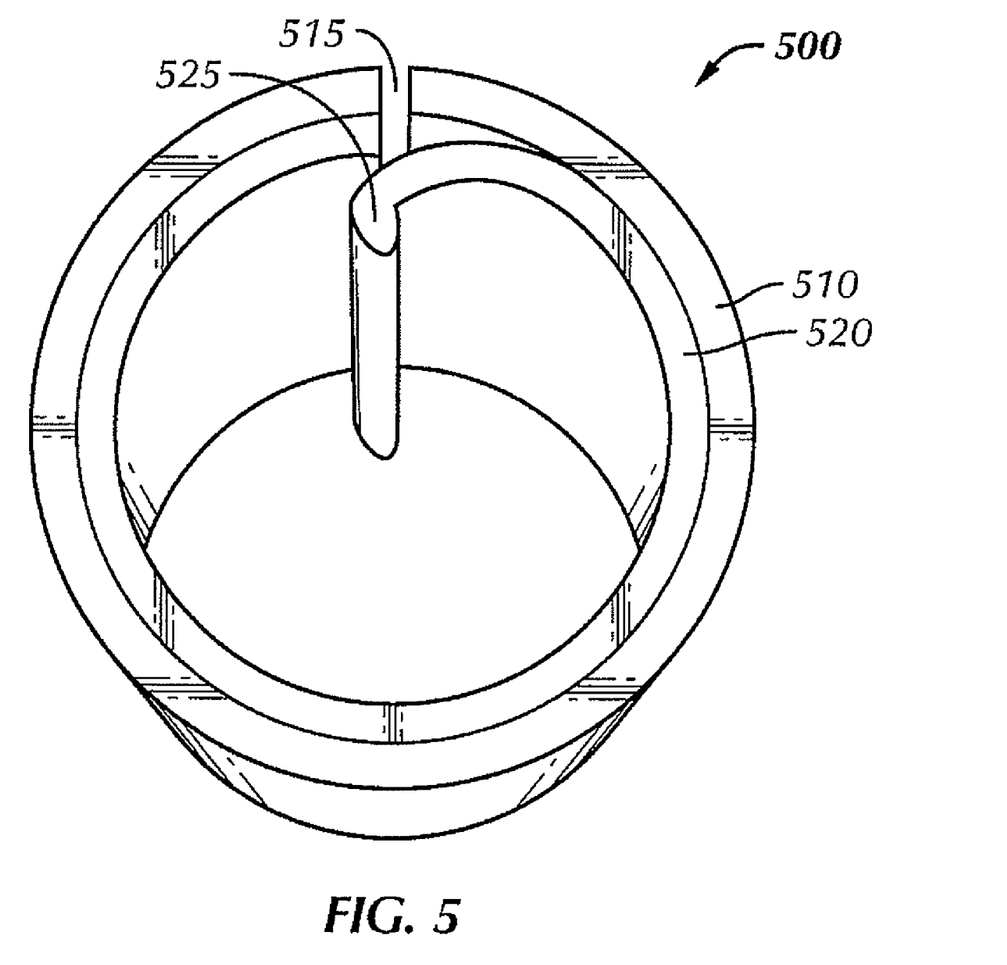
FIG. 5 is a component view of a copper lined steel tubing test sample with a copper strip width of 8.08 inches in accordance with embodiments of the present disclosure.

Referring to FIG. 5, a first test sample 500 of the copper lined steel tubing is shown in accordance with embodiments of the present disclosure. Test sample 500 includes an outer steel tubing 510 and an inner copper strip 520 having an original width of 8.08 inches formed into an inner liner. As shown, the copper strip 520 widened during the forming process to a point that edges 525 of the copper strip 520 were pushed into one another causing deformation. Further, because of the deformation, when passing through the welding process, the copper liner impacted an impeder core used in the welding process and broke the impeder free from its support. As a result of the damage to the impeder, a seam 515 of the steel tubing of test sample 500 was not properly welded.

Figure 6A:
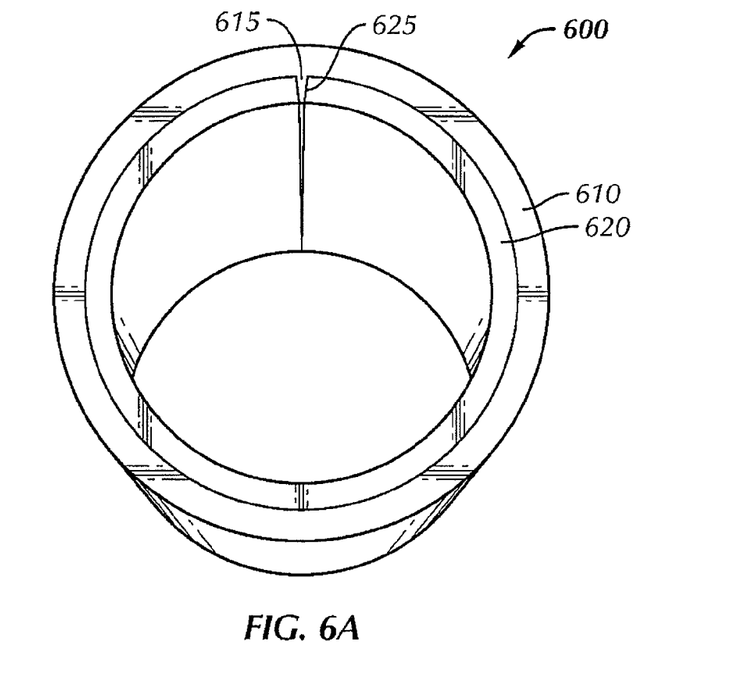
FIG. 6A is a component view of a copper lined steel tubing test sample with a copper strip width of 7.34 inches in accordance with embodiments of the present disclosure.

Referring now to FIG. 6A, a second test sample 600 of the copper lined steel tubing using a copper strip having an original width of 7.34 inches is shown in accordance with embodiments of the present disclosure. Test sample 600 includes an outer steel tubing 610 and an inner copper strip 620 which has been formed into an inner liner. During the manufacturing process, copper strip 620 was able to pass through the forming process without difficulty, although it did contact the impeder slightly. Upon completion of forming, copper strip 620 completely filled the steel tube 610 inner diameter, and edges 625 of copper strip 620 were forced together at a seam weld 615 in steel tube 610.

Figure 6B:
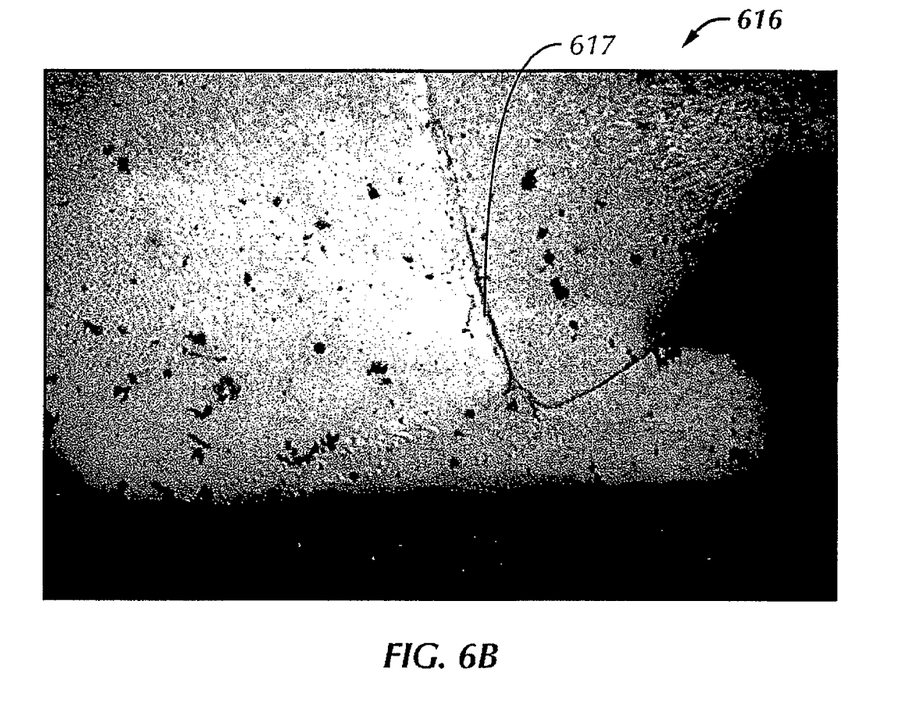
FIG. 6B is a micrograph of a weld root of the copper lined steel tubing test sample from FIG. 6A in accordance with embodiments of the present disclosure.

FIG. 6B shows a micrograph taken of a weld root 616 of seam weld 615 (FIG. 6A) from test sample 600. Test sample 600 was polished and etched to reveal the seam weld microstructure. As shown, weld root 616 was disturbed by contact from the copper strip causing a weld crack 617 to develop. Weld root 616 may have been conductively "quenched," or suddenly cooled, by the copper strip adjacent thereto, thus causing weld crack 617 to form.

Figure 7A:
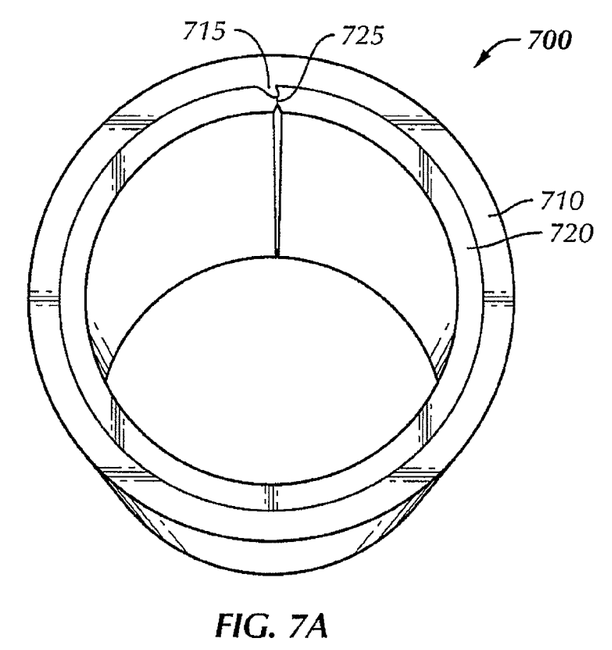
FIG. 7A is a component view of a copper lined steel tubing test sample with a copper strip width of 7.38 inches in accordance with embodiments of the present disclosure.

Referring now to FIG. 7A, a third test sample 700 of the copper lined steel tubing using a copper strip having an original width of 7.38 inches is shown. Test sample 700 comprises an outer steel tubing 710 and an inner copper strip 720 which has been formed into an inner liner. During the manufacturing process, copper strip 720 was able to pass through the forming process without difficulty, although it did contact the impeder slightly. Upon completion of forming, copper strip 720 completely filled the steel tube 710 inner diameter, and edges 725 of copper strip 720 were forced together at a seam weld 715 in steel tube 710.

Figure 7B:
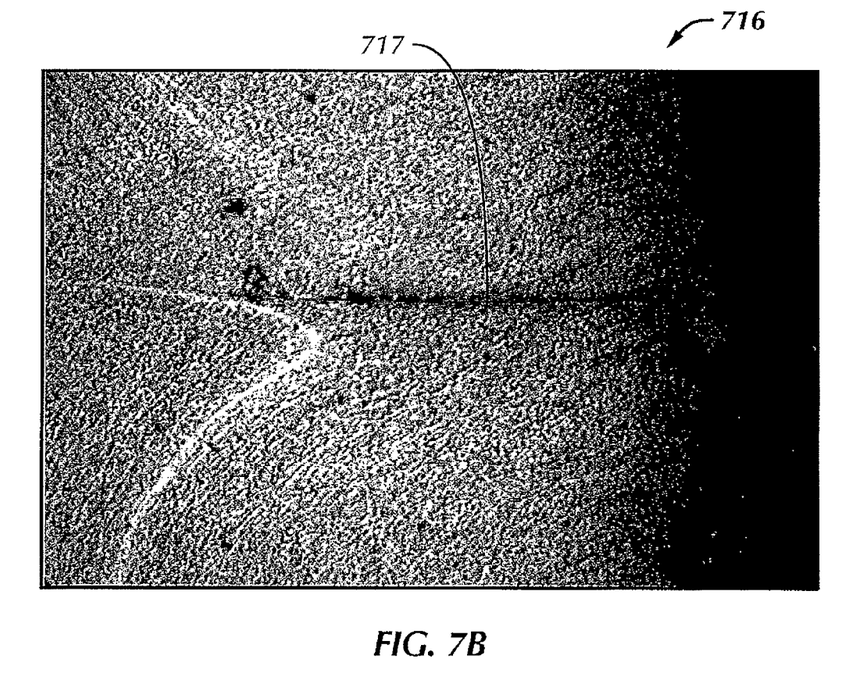
FIG. 7B is a micrograph of a weld root of the copper lined steel tubing test sample from FIG. 7A in accordance with embodiments of the present disclosure.

FIG. 7B shows a micrograph taken of a weld root 716 of seam weld 715 (FIG. 7A) from test sample 700. Test sample 700 was polished and etched to reveal the seam weld microstructure. As shown, weld root 716 was disturbed by contact from the copper strip causing a weld crack 717 to develop at the outer diameter of the steel tube.

After running test sample 600 and test sample 700 and observing the tight fit in the steel tubing produced by both, it was decided that the planned test using a 7.76 inch width copper strip would have resulted in worse results and, therefore, should not have been performed. However, it should be understood that this may be relevant only to the 2⅞ inch diameter steel tube used.

Figure 8A:
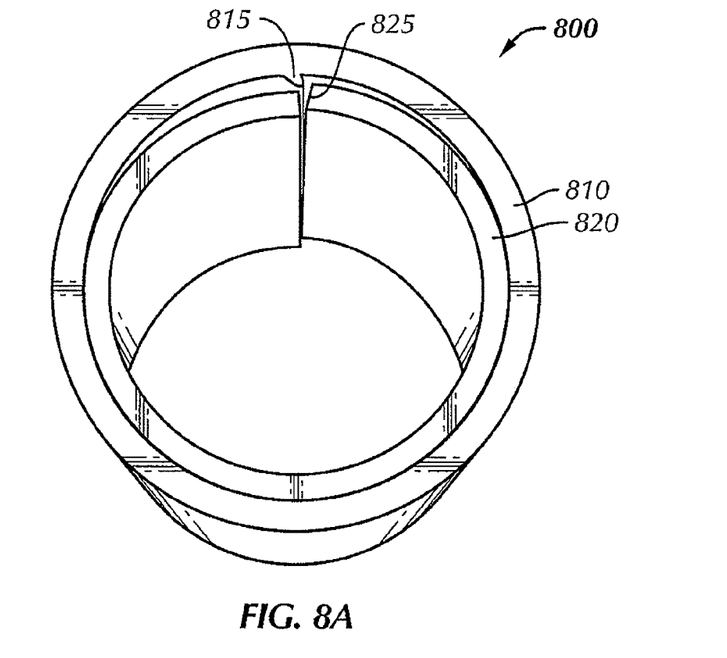
FIG. 8A is a component view of a copper lined steel tubing test sample with a copper strip width of 7.08 inches in accordance with embodiments of the present disclosure.

Referring now to FIG. 8A, a fourth test sample 800 of the copper lined steel tubing using a copper strip having an initial width of 7.08 inches is shown. Test sample 800 comprises an outer steel tubing 810 and an inner copper strip 820 which has been formed into an inner liner. During the manufacturing process, copper strip 820 was able to pass through the forming process without incident. Upon completion of forming, the copper strip 820 did not completely fill the inner diameter of the steel tube 810. Further, an edge 825 of copper strip 820 contacted a seam weld root 815.

Figure 8B:
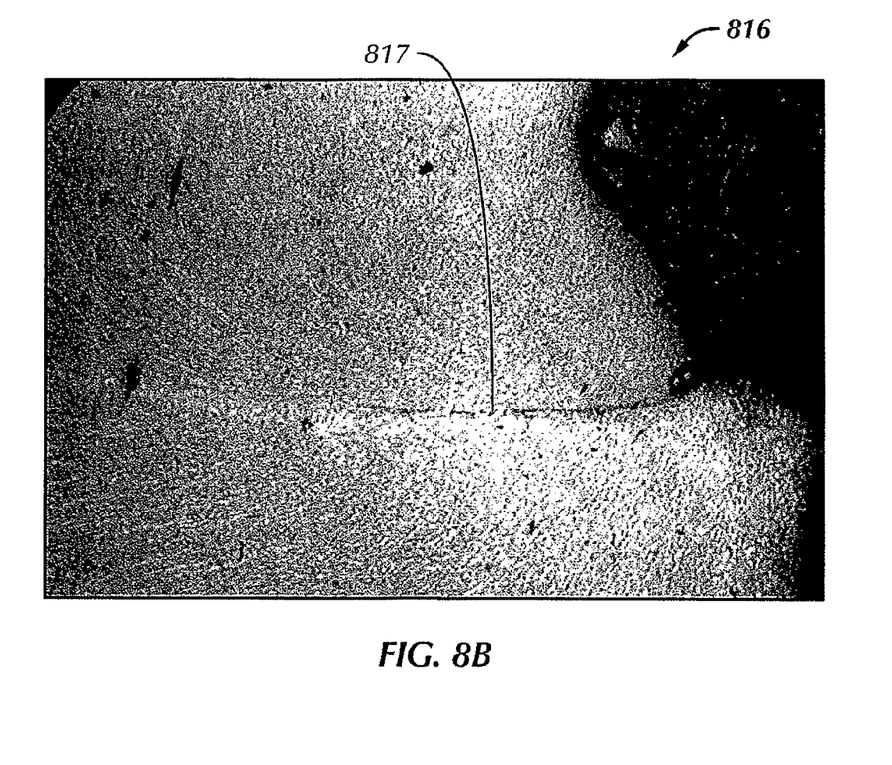
FIG. 8B is a micrograph of a weld root of the copper lined steel tubing test sample from FIG. 8A in accordance with embodiments of the present disclosure.
Figure 8C:
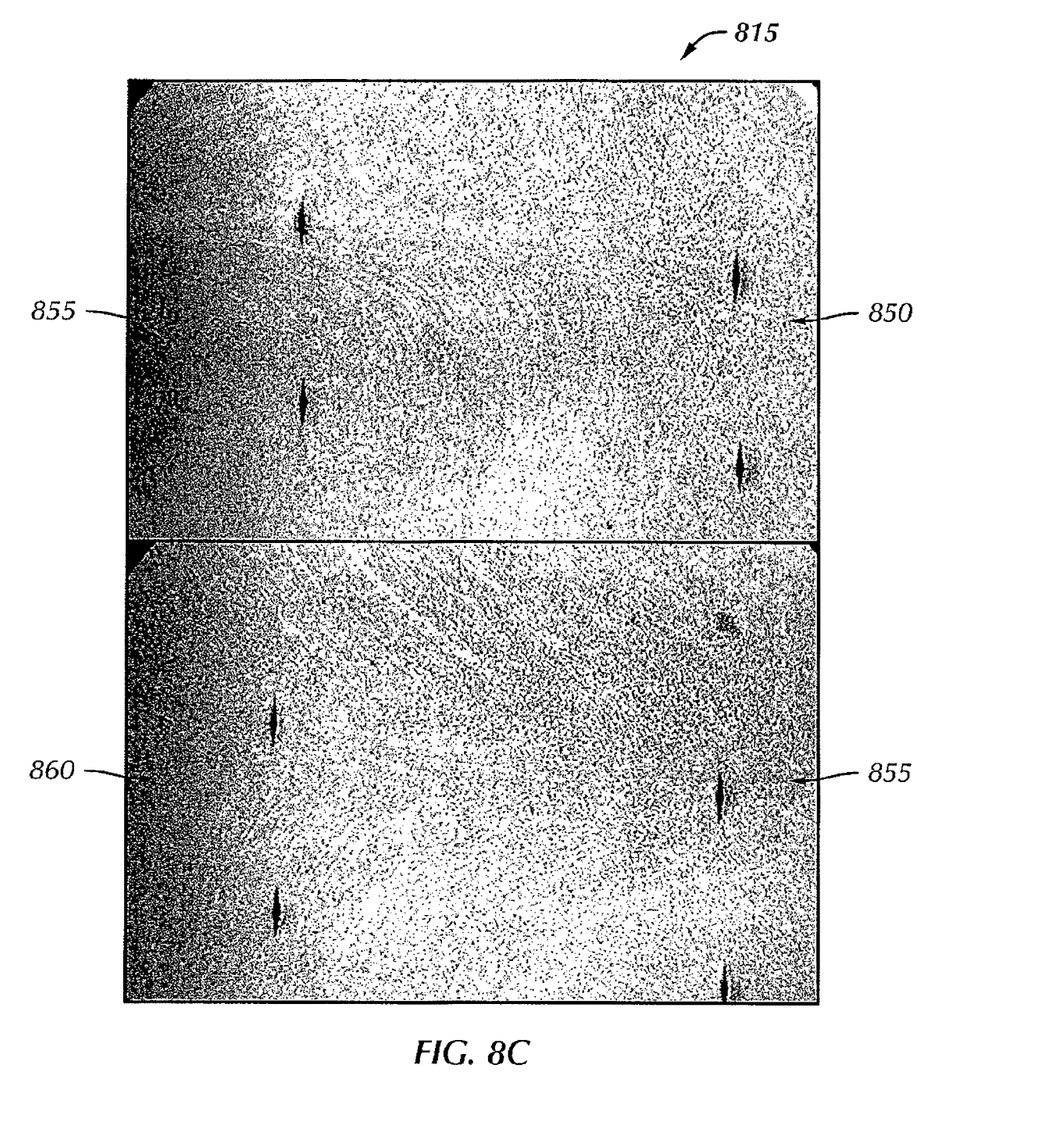
FIG. 8C is a micrograph of a seam weld in the steel tubing test sample from FIG. 8A in accordance with embodiments of the present disclosure.

FIG. 8B shows a micrograph taken of a weld root 816 of seam weld 815 (FIG. 8A) from test sample 800 in accordance with embodiments of the present disclosure. Test sample 800 was polished and etched to reveal the seam weld microstructure. As shown, weld root 816 was disturbed by contact from the copper strip causing a weld crack 817 to develop at the outer diameter of the steel tube. Edge 825 of copper strip 820 in contact with weld root 816 may have quenched weld seam 815 and disrupted the formation of weld root 816. Further, referring to FIG. 8C, seam weld 815 through the steel material is shown illustrating an "S" pattern which appeared across the steel tube wall thickness. The micrograph shows seam weld 815 beginning at an outer diameter 850 of the steel tube and running through a middle section 855 to an inner diameter 860 of the steel tube. This pattern may have been caused by edge 825 of copper strip 820 in contact with weld root 816, as described above.

Figure 9A:
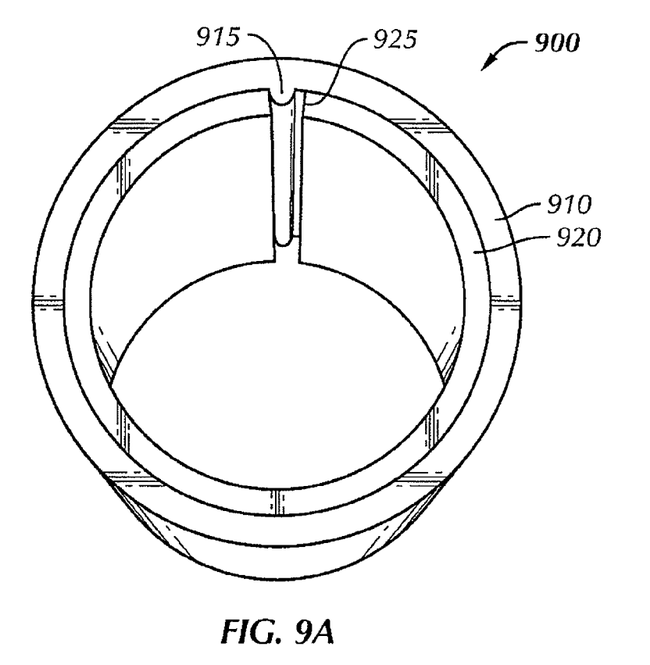
FIG. 9A is a component view of a copper lined steel tubing test sample with a copper strip width of 7.14 inches in accordance with embodiments of the present disclosure.

Referring now to FIG. 9A, a fifth test sample 900 of the copper lined steel tubing using a copper strip having an original width of 7.14 inches is shown. Test sample 900 comprises an outer steel tubing 910 and an inner copper strip 920 which has been formed into an inner liner. During the manufacturing process, the copper strip 920 was able to pass through the forming process without incident. Upon completion of forming, the copper strip 920 did not completely fill the inner diameter of the steel tube 910. Further, edges 925 of inner copper liner 920 were better centered about a seam weld root 915 and did not appear to contact it.

Figure 9B:
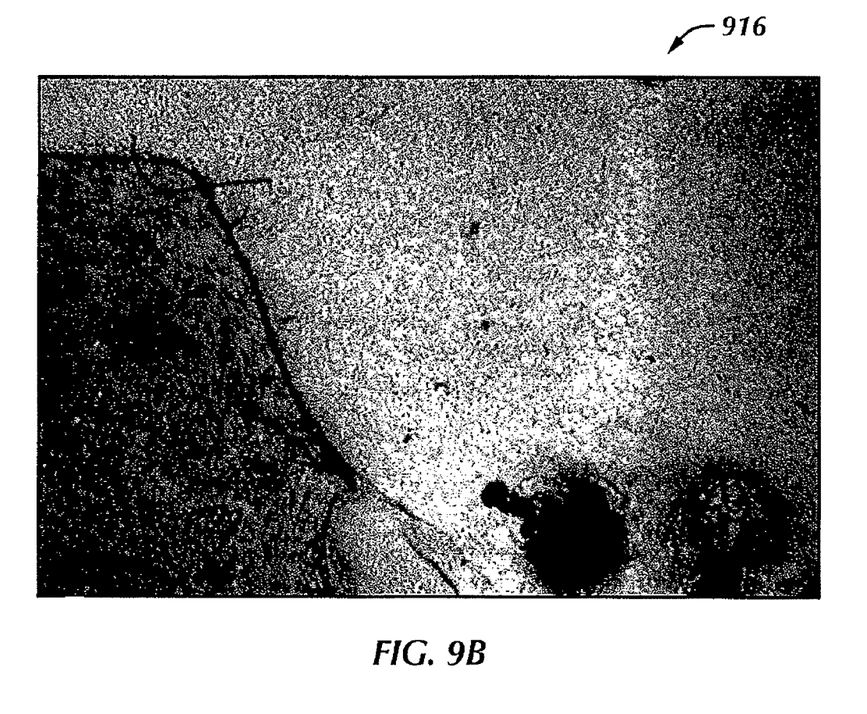
FIG. 9B is a micrograph of a weld root of the copper lined steel tubing test sample from FIG. 9A in accordance with embodiments of the present disclosure.
Figure 9C:
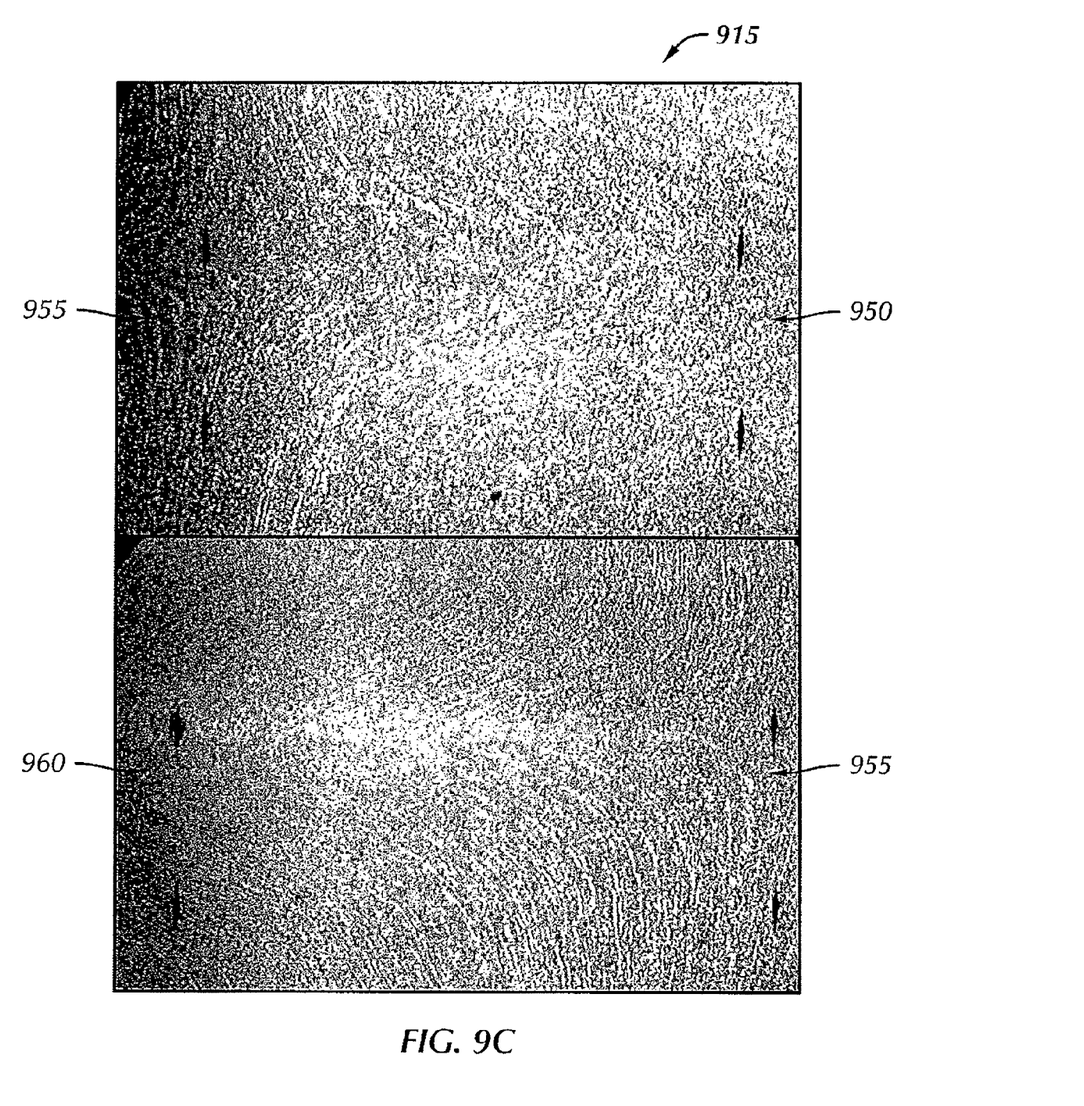
FIG. 9C is a micrograph of a seam weld in the steel tubing test sample from FIG. 9A in accordance with embodiments of the present disclosure.

FIG. 9B shows a micrograph taken of a weld root 916 of seam weld 915 (FIG. 9A) from Test Sample 900 in accordance with embodiments of the present disclosure. Test sample 900 was polished and etched to reveal the seam weld microstructure. As shown, cracks did not develop in weld root 916 since there was not contact between the copper strip and the seam weld in the steel tube. Further, referring to FIG. 9C, the seam weld 915 through the steel material was straight through the steel tube wall thickness, rather than having an "S" shape as described previously. This may be due to the copper strip not contacting the seam weld.

Evaluation of the test samples and micrographs showed that the test samples using the 7.08 inch and 7.14 inch width copper strips may be the optimum size for use with the steel tube in the process disclosed herein. A significant determining factor in this was that the 7.08 inch and 7.14 inch width copper strips, when not in contact with the seam weld in the steel tube, did not cause cracks to develop in the seam weld.

Mechanical properties of test samples 800 and 900 (FIGS. 8 and 9) were compared with reference values from a steel tube milled from the same material but without the copper strip. Yield strengths, tensile strengths, and elongation values were about the same for the two test samples as compared to the reference tube material. Hardness values for test sample 800 were close to hardness values for the reference tube material, however the hardness values for test sample 900 were higher than test sample 800 and reference tube material. Referring to Table 1, mechanical properties of test samples 800 and 900 and the reference tube are shown in accordance with embodiments of the present disclosure. Mechanical properties shown include annealing temperatures, mill speed, yield and tensile strengths, etc.

TABLE 1

Mechanical Properties

| Property | Test Sample 800 | Test Sample 900 | Reference Tube |
| --- | --- | --- | --- |
| Full Body Annealing Temp (C.) | 1080 | 1080 | 1120 |
| Mill Speed (fpm) | 60 | 60 | 80 |
| OD (min/max in) | 2.873/2.877 | 2.873/2.877 | 2.883/2.883 |
| Gauge (min/max in) | .193/.195 | .193/.195 | .191/.191 |
| Mismatch (min/max in) | .203/.203 | .203/.203 | .195/.197 |
| Yield Strength (ksi) | 74.5 | 73.3 | 74.9 |
| Tensile Strength (ksi) | 85.2 | 84.7 | 87.4 |
| Elongation (%) | 26 | 27 | 26 |
| Weld Hardness (HRB) | 95.5 | 24.2HRC | 95.0 |
| HAZ Hardness (HRB) | 90.4 | 98.6 | 92.2 |

TABLE 1-continued

Mechanical Properties

| Property | Test Sample 800 | Test Sample 900 | Reference Tube |
|---|---|---|---|
| Base Hardness (HRB) | 90.8 | 97.2 | 91.6 |
| Crush Test | Pass | Pass | Pass |
| Flair Test | Pass | Pass | Pass |

Test samples 800 and 900 were subjected to hydrostatic pressure testing using the 36 inch long test sections. The test samples were tested to failure, with test sample 800 failing at a pressure of 12,090 psi, and test sample 900 failing at a pressure of 11,910 psi. However, neither test sample failed at the seam weld in the steel tubing.

After inspection of the copper lined steel tube test samples, a copper strip width for filling the 2⅞×0.190 inch steel tube inner diameter in a range between about 7.38 inches and about 7.08 inches may be desired. Further, the copper strip width for filling the steel tube inner diameter may be closer to 7.08 inches. Examination of the 7.08 inch and 7.14 inch width copper strips showed that if the edges of the copper strip do not contact each other or another surface in such a way as to cause a compressive hoop stress in the copper strip, the steel tube inner diameter is not completely filled, and there will be a gap between the steel tube and inner copper liner. However, when the edges of the copper strip did contact each other or another surface, as with the 7.34 inch and 7.38 inch width copper strips, the copper completely fills the steel tube inner diameter without any gaps.

Inspection of the seam welds in the steel tube may have provided information concerning the weld quality of the seam weld when using the copper strips. If the copper strip contacts any part of the seam weld during the welding process, the proper formation of the weld may be disrupted and an inner diameter weld crack may be formed. This was shown in test samples 600, 700, and even 800 when one edge of the copper strip contacted the seam weld. Because of the contact between the edges of the copper strip and the seam weld, the copper strip may be cooling the weld material to temperatures below which an acceptable weld may be made. Test sample 900, which was centered about the seam weld and did not contact it, did not have cracks develop, and therefore may not have degraded the seam weld quality.

Referring back to Table 1 and a comparison of the mechanical properties of the test samples, the mechanical properties may not be affected by the presence of the copper strip. A comparison of the hardness values of test sample 800 with the reference tube material show that proper hardness values may be achieved. The high hardness value of test sample 900 may be due to the seam weld in the steel tube not being centered under the seam annealer during the welding of the steel tube. Further, inspection of the tubing with an Eddy Current Sector Coil and Encircling Coil, both of which are used to check for flaws in the weld, did not appear to be adversely affected by the presence of the copper strip. Further, ultrasonic inspection was performed and appeared not to be affected by the presence of the copper liner. A mechanical fit of the copper liner in the steel tube was also performed in all the test samples. The copper liner did not fall out of any of the test samples on its own, however, the copper strip may be pushed out of the short test samples by hand with little effort.

Alternative embodiments to manufacture a copper lined steel tubing include centering the copper strip in the steel tube using the fin pass rollers in the forming stage (FIGS. 3 and 4) and adding an internal roller to force the copper against the steel tube inner diameter. This addition may prove successful since the copper will be heated during the forming and welding processes and may retain the shape without much elastic spring back.

Further, alternative embodiments of manufacturing the copper lined steel tubing include milling the steel tube in an oversized configuration initially and welding. Upon completion of welding, the steel tube may be resized down to a finished size. This added gap while welding may keep the copper strip far enough away from the steel tube that it does not quench the weld as much, allowing for stronger welds and alleviating concerns about weld cracks.

Empirical Relationships

Empirical relationships between a given steel tubing size and an appropriate width of copper strip for co-forming may be applied over a range of tubing sizes. A nominal tubing outer diameter, $OD_{tube}$, and a wall thickness, $thk_{wall}$, are values dependent on the overall size of tubing desired. Further, a thickness of the copper strip, $thk_{cu}$, and a seam weld thickness in the steel tubing, $thk_{weld}$, may be estimated values used in determining an appropriate width copper strip. An outer diameter to which the copper strip may be formed, $OD_{cu}$, is calculated using equation 1 below:

$$OD_{cu} = OD_{tube} - (2*thk_{wall}) \tag{Eq. 1}$$

The outer diameter of the copper strip may interface with an inner diameter of the steel tube. Further, an outer circumference of the copper strip, $cir_{cu}$, may be calculated using equation 2 as follows:

$$cir_{cu} = (\pi*(OD_{tube} - (2*thk_{wall}))) - thk_{weld} \tag{Eq. 2}$$

A steel tube milled outer diameter, $OD_{mill}$, may be calculated by summing a copper milled oversize tolerance, $Cu_{mill}$, with the nominal tubing outer diameter, $OD_{tube}$, as follows in equation 3:

$$OD_{mill} = OD_{tube} + Cu_{mill} \tag{Eq. 3}$$

Still further a steel tube/copper milling outer diameter, $OD_{cs/cu}$, may be calculated from the following equation 4:

$$OD_{cs/cu} = OD_{mill} + Cu_{mill} \tag{Eq. 4}$$

From the above preliminary calculations, a desired welding bead clearance, $weld_{clearance}$, between the steel tube and copper line may be calculated from the following equation 5:

$$weld_{clearance} = \frac{\pi*\left(\begin{array}{c}(OD_{cs/cu} - 2*(thk_{wall})) - \\ cir_{cu} - thk_{weld}\end{array}\right)}{2} \tag{Eq. 5}$$

Further, an empirical stretch factor for the copper strip may be calculated for a range of tube sizes. A ratio, D/t, of the nominal outer diameter of a tube, $OD_{tube}$, and the wall thickness of the tube, $thk_{wall}$, is used in relating measured characteristics of the test pipe to a range of tube sizes. The ratio is shown in equation 6 as follows:

$$D/t = \frac{OD_{tube}}{thk_{wall}} \tag{Eq. 6}$$

With the test sample results described previously, and measurements of the test samples, the method of selecting an appropriate width copper strip may be applied over a range of tube sizes in the following manner. A copper strip stretch factor, $stretch_{cu}$, may be calculated using a ratio of the D/t calculation, D/t*, for 2⅞ inch steel tube, and a ratio of a D/t calculation for a desired tube size to which to apply the method of manufacturing lined pipe. The stretch factor may further be formulated in a manner known to one having ordinary skill in the art, i.e., the value "X" and the exponent "e" used in equation 7. Equation 7 shows a calculation of a copper strip stretch factor, $stretch_{cu}$.

$$stretch_{cu} = X * \left[\frac{(D/t)}{(D/t^*)}\right]^e \quad \text{(Eq. 7)}$$

A copper strip width, $width_{cu}$, may be calculated upon running through the previous series of preliminary calculations as follows in Equation 8:

$$width_{cu} = \frac{cir_{cu}}{stretch_{cu}} \quad \text{(Eq. 8)}$$

Embodiments of the present disclosure may provide an improved method of manufacturing lined tubing for several reasons. The method disclosed of determining appropriate liner strip widths may allow pipe manufacturers to simultaneously co-form an outer base material and inner liner material strips into a tube with an internal liner while still using a welded tube milling process. Further, the method allows manufacturing of a steel tube with an internal copper liner, for example, whereby the copper liner is formed and placed so that the copper liner edges are immediately adjacent to an internal seam weld bead in the steel tube.

Advantageously, a method of determining values of both steel and copper strip widths which may allow the copper to completely fill the tubing inner diameter without interfering with the seam weld in the steel tubing is presented. Interference of the copper liner with the welding process has been shown to adversely affect the integrity of the seam welds, causing weld cracks to form. Furthermore, tube mill set up parameters that may allow the copper to completely fill the tubing inner diameter without interfering with the seam weld in the steel tubing, specifically, running less reduction in fin roller passes and larger reduction in sizing passes are presented.

Still further, advantages are provided from embodiments of the present disclosure in selecting various combinations of steel and copper diameters and wall thicknesses that may satisfy manufacturing requirements and design requirements of customers. More particularly, requirements such as sufficient copper cross-sectional area and internal clearance for features including, but not limited to ceramic centralizers may be satisfied.

Embodiments of the present disclosure may advantageously identify performance criteria that measure the suitability of the copper lined steel tubing to perform properly. These criteria include, but are not limited to, tube ovality, pressure integrity, internal ovality/clearance, seam weld integrity, and the strength of the interference fit between the steel tube and the copper liner.

Embodiments of the present disclosure may provide an accurate and reliable method of calculating material requirements for lined steel tubing. For example, the method may allow a copper strip width to be calculated for use in forming lined steel tubing. Optimum mill parameters may be identified from corresponding performance criteria, improving mill setup and increasing production. The accuracy of the method may further allow manufacturers of lined welded pipe to calculate appropriate strip widths before manufacturing. The ability to accurately calculate material needs may increase productivity of lined tubing, and decrease material waste from errors in estimating the amount of material needed. Further, estimated costs to manufacture in commercial production quantities may be more accurately determined, which in turn may result in higher productivity and lower material costs.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed:

1. A method to manufacture tubing, the method comprising:
    centrally positioning a liner material strip on a base material strip;
    co-forming the base material strip and the liner material strip into a tubular, wherein the tubular comprises an outer base material tubular having an inner liner material tubular disposed therein;
    circumferentially aligning adjacent edges of the inner liner material tubular with adjacent edges of the outer base material tubular;
    welding the adjacent edges of the outer base material tubular and forming a welded seam in the outer base material tubular, wherein the adjacent edges of the inner liner material tubular remain un-welded; and
    radially expanding the inner liner material tubular and maintaining an unexpanded original diameter of the outer base material tubular, wherein an outer surface of the inner liner material tubular is in substantial contact with an inner surface of the unexpanded outer base material tubular.

2. The method of claim 1, further comprising reducing an outer diameter of the outer base material tubular.

3. The method of claim 1, wherein welding comprises electric resistance welding (ERW).

4. The method of claim 1, further comprising heat treating the welded seam.

5. The method of claim 1, further comprising forming the tubular into a coiled configuration.

6. The method of claim 1, further comprising testing the tubular against selected performance criteria.

7. The method of claim 6, wherein the selected testing criteria includes at least one from the group consisting of external tube ovality, pressure integrity, internal tube ovality, seam weld integrity, and strength of an interference fit between base material strip and the liner material strip.

8. The method of claim 1, further comprising co-forming the base material strip and the liner material strip into a tubular with an external roller.

9. The method of claim 1, further comprising co-forming the base material strip and the liner material strip into a tubular with an internal roller.

10. The method of claim 1, further comprising machining an inner diameter of the tubular to a finish size.

11. The method of claim 1, further comprising machining an outer diameter of the tubular to a finish size.

12. The method of claim 1, wherein the base material strip comprises steel.

13. The method of claim 1, wherein the liner material strip comprises a copper-based alloy.

14. A method to manufacture tubing, the method comprising:
- centrally positioning a liner material strip on a base material strip;
- co-forming the base material strip and the liner material strip into a tubular, wherein the tubular comprises an outer base material tubular having an inner liner material tubular disposed therein;
- circumferentially aligning adjacent edges of the inner liner material tubular with adjacent edges of the outer base material tubular;
- welding the adjacent edges of the outer base material tubular and forming a welded seam in the outer base material tubular, wherein the adjacent edges of the inner liner material tubular remain un-welded; and
- radially expanding the inner liner material tubular and maintaining an unexpanded original diameter of the outer base material tubular, wherein an outer surface of the inner liner material tubular is in substantial contact with an inner surface of the unexpanded outer base material tubular;
- wherein the base material strip comprises a width of about 2.875 inches and a thickness of about 0.190 inches.

15. The method of claim 14, wherein the liner material strip has a width of between about 7 inches and about 7.37 inches.

* * * * *